April 7, 1970 E. D. HARRIS 3,505,510

COUNTER, DELAY GENERATOR AND WORD GENERATOR

Filed May 4, 1965 5 Sheets-Sheet 1

INVENTOR

ELLIS D. HARRIS

BY James D. Murray

R. S. Sciascia ATTORNEYS

INVENTOR
ELLIS D. HARRIS
BY James D. Murray
R. S. Sciascia
ATTORNEYS

INVENTOR
ELLIS D. HARRIS
BY James G. Murray
R. J. Sciascia ATTORNEYS

INVENTOR
ELLIS D. HARRIS
BY James B. Murray
[signature]
ATTORNEYS

April 7, 1970 E. D. HARRIS 3,505,510

COUNTER, DELAY GENERATOR AND WORD GENERATOR

Filed May 4, 1965 5 Sheets-Sheet 5

INVENTOR

ELLIS D. HARRIS

BY James G. Murray

[signature] ATTORNEYS

United States Patent Office 3,505,510

Patented Apr. 7, 1970

3,505,510
COUNTER, DELAY GENERATOR AND WORD GENERATOR

Ellis D. Harris, 2166 Gardi St., Bradbury, Calif. 91010

Filed May 4, 1965, Ser. No. 453,230
Int. Cl. H04l 3/00
U.S. Cl. 235—155 7 Claims

ABSTRACT OF THE DISCLOSURE

A clock-controlled electric matrix circuit which changes the radix of a signal and which, in other embodiments and in combination with other circuitry, functions as a coding device, counter, delay generator or word generator.

The invention described herein may be manufactured and used by or for the Government of the United States of America for governmental purposes without the payment of any royalties thereon or therefor.

The present invention relates to electrical circuits and more particularly to matrix circuits suitable for use in electronic computers.

In the past decade there has been a tremendous increase in the use of electronic computers in environments wherein size, weight and power consumption are critical factors. Concurrently the need has arisen for computer circuitry which is not only small and light and has a minimum power demand but also is adapted to perform diverse functions. This invention provides such circuitry.

It is, therefore, an object of this invention to provide a device which is physically small and light, has a small power demand and is capable of performing diverse functions.

It is another object of this invention to provide a matrix circuit which is capable of being used as a radix changer, as a permuting or coding device, as a counter, as a delay generator or as a word generator.

Yet another object of the present invention is the provision of an electrical matrix circuit, suitable for use in a computer, which is small and light and has a minimum power demand and is adapted to be used as a radix changer, as a permuting or coding device, as a counter, as a delay generator or as a word generator.

Other objects and features of the invention will become apparent to those skilled in the art as the disclosure is made in the following description of a preferred embodiment of the invention as illustrated in the accompanying drawings in which.

The matrix circuit 10, which is the basic part of this invention, is intended to be used in a computer which is controlled by a two-phase clock 20, symbolically illustrated as producing two 180° opposed phase A and phase B signals. Such computers are well known and, beyond providing the environment, do not form a part of the invention.

Figure 1:
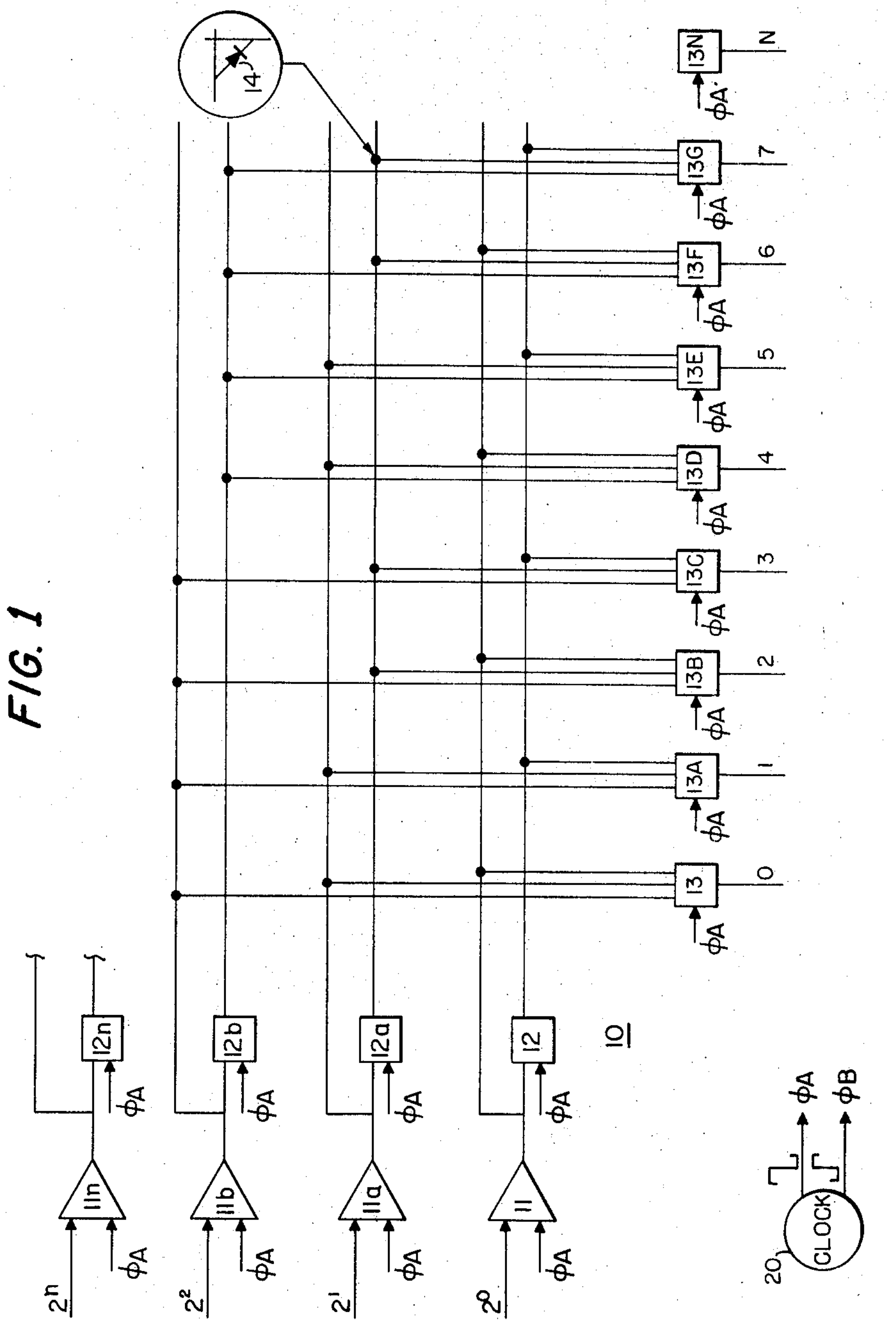
FIG. 1 illustrates the invention connected to function as a radix changer.

Referring now to the drawings, wherein like reference characters designate like or corresponding parts throughout the several figures, the matrix circuit 10 is shown in FIG. 1 as being connected to function as a radix changer, or more specifically, connected to change a binary input into a decimal output.

Each of the binary input channels, $2^0$, $2^1$, $2^2$ . . . $2^n$, include an AND gate 11, 11*a*, 11*b* . . . 11*n* connected to receive the binary input pulses and the A phase clock signal, both of which are synchronized at a frequency which could typically be 1 kc. The components 11, 11*a*, 11*b* . . . 11*n* are preferably, but not necessarily, one of the many well known transistorized coincident gate or gated amplifier circuits which do not produce an output unless both input signals are simultaneously applied. The outputs of the gates 11, 11*a*, 11*b* . . . 11*n* are connected into the matrix wiring structure both directly and through complementors or synchronous NOT circuits 12, 12*a*, 12*b* . . . 12*n*. The complementors, which are also connected to the phase A clock signal, can be any of the well known, preferably transistorized, circuits which are functionally characterized by passing the clock phase signal in the absence of a signal from the gates 11, 11*a*, 11*b* . . . 11*n* and blocking the phase signal when a signal is applied by the gates 11, 11*a*, 11*b* . . . 11*n*.

The number of output channels 0, 1, 2 . . . N in matrix circuit 10 is the equivalent in the decimal radix to the binary radix count obtainable from the input channels. For drafting convenience only three binary radix input channels and eight decimal radix output channels have been shown. However, it should be emphasized that other combinations, such as 6 input and 64 output channels could also be used. Each output channel includes a complementor 13, 13A, 13B . . . 13N, similar to the complementor 12, which is also connected to the phase A clock signal and which passes the clock phase signal in the absence of a signal in all of the other complementor inputs and blocks the clock phase signal when a signal is applied to any of the other complementor inputs.

The input and output channels of matrix circuit 10 are connected so that input pulses representing a number in the binary radix produces an output pulse in the appropriate decimal radix output channel. To illustrate, the number 6, conventionally represented in binary notation as 110, would be applied to matrix circuit 10 as pulses in input channels $2^1$ and $2^2$. The absence of an input pulse in channel $2^0$ would allow complementor 12 to pass the phase A clock signal, thereby causing blocking, i.e. no output, by the complementors in output channels 1, 3, 5 and 7. The input pulse in channel $2^1$, in addition to causing complementor 12*a* to be blocked, would be applied directly to and cause blocking in the output channels 0, 1, 4 and 5. The input pulse in channel $2^2$, in addition to causing complementor 12*b* to be blocked, would be applied directly to and cause blocking in the output channels 0, 1, 2 and 3. Since no pulse is applied to the matrix inputs of complementor 13F in output channel 6, the phase A clock signal will be passed by this complementor and appear as an output pulse in channel 6, thereby representing in decimal radix form the binary radix input.

Matrix 10 can be enlarged, in fact generalized, by connecting the input and output channels according to the rule that each $2^n$ input channel is alternately directly connected and connected through a complementor 12*n* to incremental numbers of output channels where the incremental number is equal to $2^n$. In a 5 input, 32 output channel matrix, the $2^2$ input channel would be directly connected to output channels 0, 1, 2, 3, 8, 9, 10, 11, 16, 17, 18, 19, 24, 25, 26, 27 and through the complementor 12*b* to the other output channels. The incremental number in the $2^2$ channel is of course, four.

As illustrated, the connection between the input and output channels is by means of a semi-conductor, such as 14.

Figure 2:
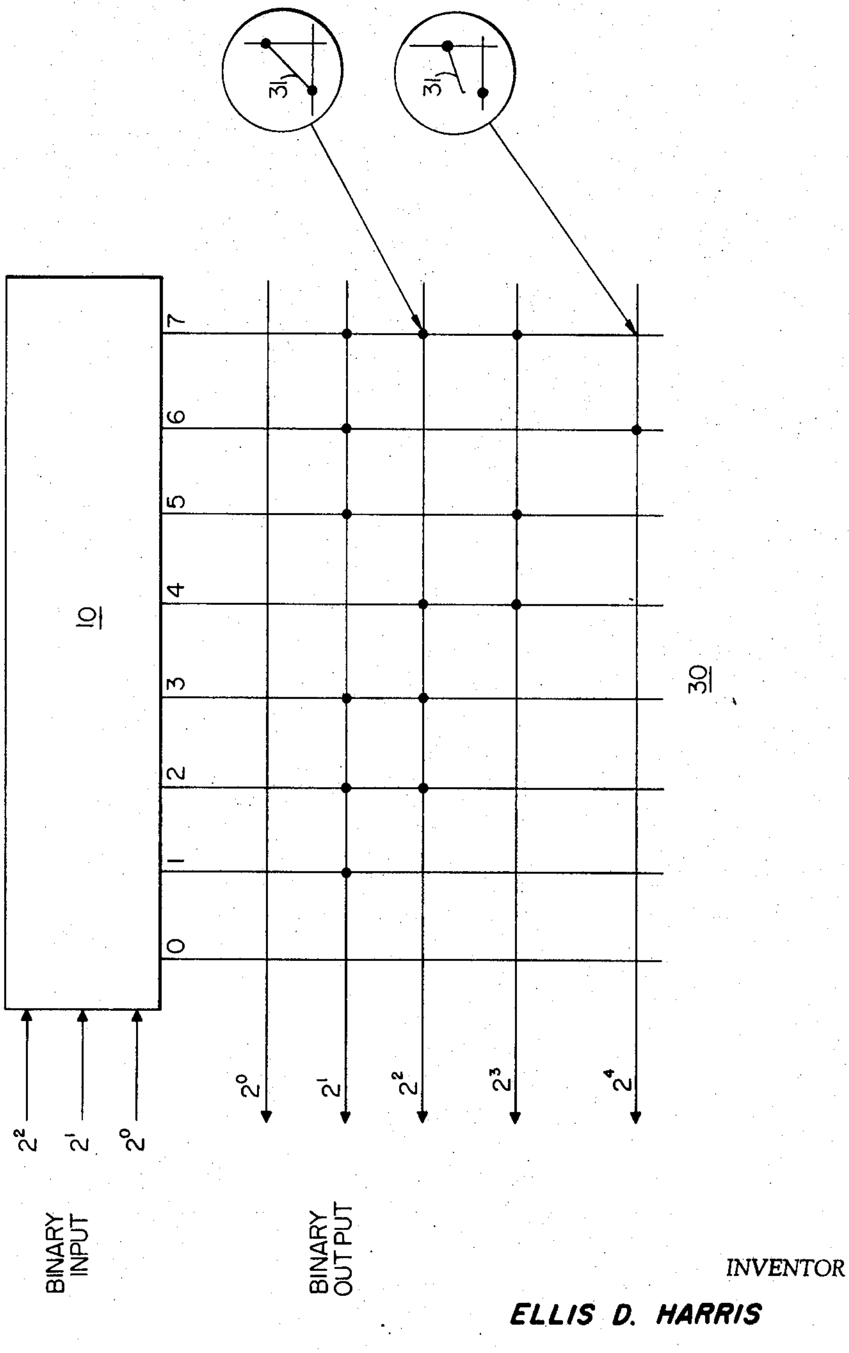
FIG. 2 illustrates the invention connected to function as a permuting or coding device.

In FIG. 2 the invention is shown as being connected to function as a permuting or coding device, wherein the binary radix input, which, as discussed, is converted to a decimal radix signal by matrix 10, is further converted by matrix 30 into a permuted, or coded, binary radix output.

The output channels 0, 1, 2 . . . 7 of matrix 10 are connected to matrix 30, which can be of any size, but is illustrated as being in 5 digit binary radix form. Although electronic switches can equally well be used, the connections in matrix 30 are illustrated as being by mechanical switches 31.

The permutation and coding possibilities are obviously infinite and depend upon the setting of the switches 31. As illustrated the relationship between the binary radix input to matrix 10 and the binary radix output of matrix 30 is X2 for odd number inputs and X3 for even number inputs, i.e. a binary input of 3 appears as a binary output of 6 and a binary input of 6 appears as a binary output of 18.

Figure 3:
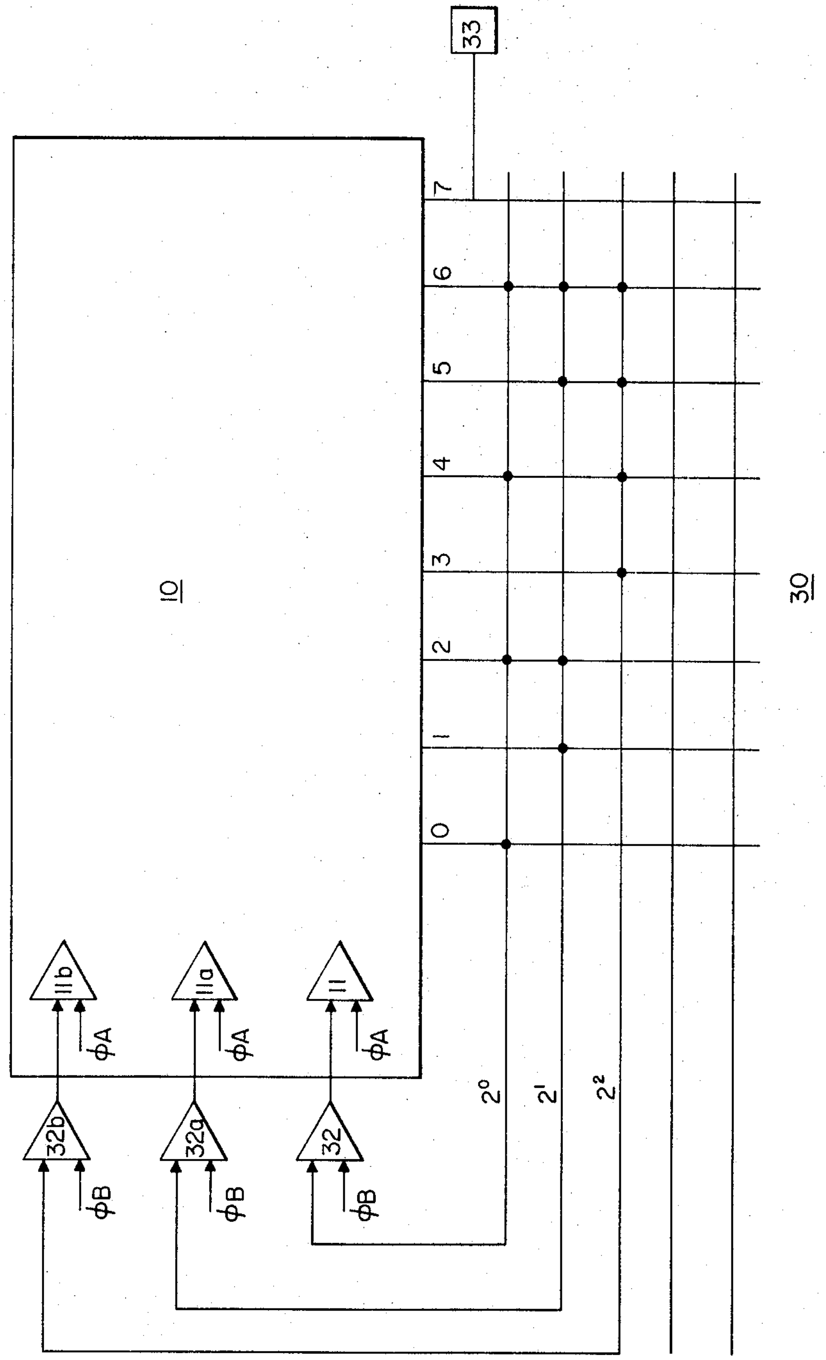
FIG. 3 illustrates the invention connected to function as a counter.

In FIG. 3 the invention is shown as connected to function as a device which will count the number of cycles in the prase A signal of clock 20 (see FIG. 1). the matrix 30 is so connected that decimal radix zero signal input to matrix 30 will appear as a binary radix one output signal; a decimal radix one signal input will appear as a binary radix two output signal, etc. The binary radix output of matrix 30 is connected to the input of matrix 10 by AND gates 32, 32*a* and 32*b* which are also connected to the B phase of clock 20. These gates are similar to the gates 11, 11*a* and 11*b*.

It can be seen that on the initial clock signal, the zero input to matrix 10 will be re-entered one clock cycle later as a "one" input, and that this signal will be continually counted upward until the 7 decimal radix output of matrix 10 will be re-entered as a zero input count. The 7 decimal radix output pulse can also be used to actuate a register 33 to count beyond 7.

The operational characteristics of the gates, complementors, the semi-conductors and the clock frequency must be such that a signal produced by gate 11 concurrently with an A phase clock signal will progress through complementor 12, diode 14 and matrix 30 to cause gate 32*a* to produce a signal concurrently with the B phase clock signal, which will in turn cause gate 11*a* to produce a signal concurrently with the next A phase clock signal.

It will be apparent that the apparatus illustrated in FIG. 3 could also be utilized as a frequency divider since a pulse will appear on one of the decimal outputs of matrix 10, say output 7, at a frequency one-eighth that of the clock. If all of the pulses in the decimal outputs of matrix 10 are utilized, the apparatus of FIG. 3 could be considered as producing an 8 phase output at one-eighth the clock frequency.

Figure 4:
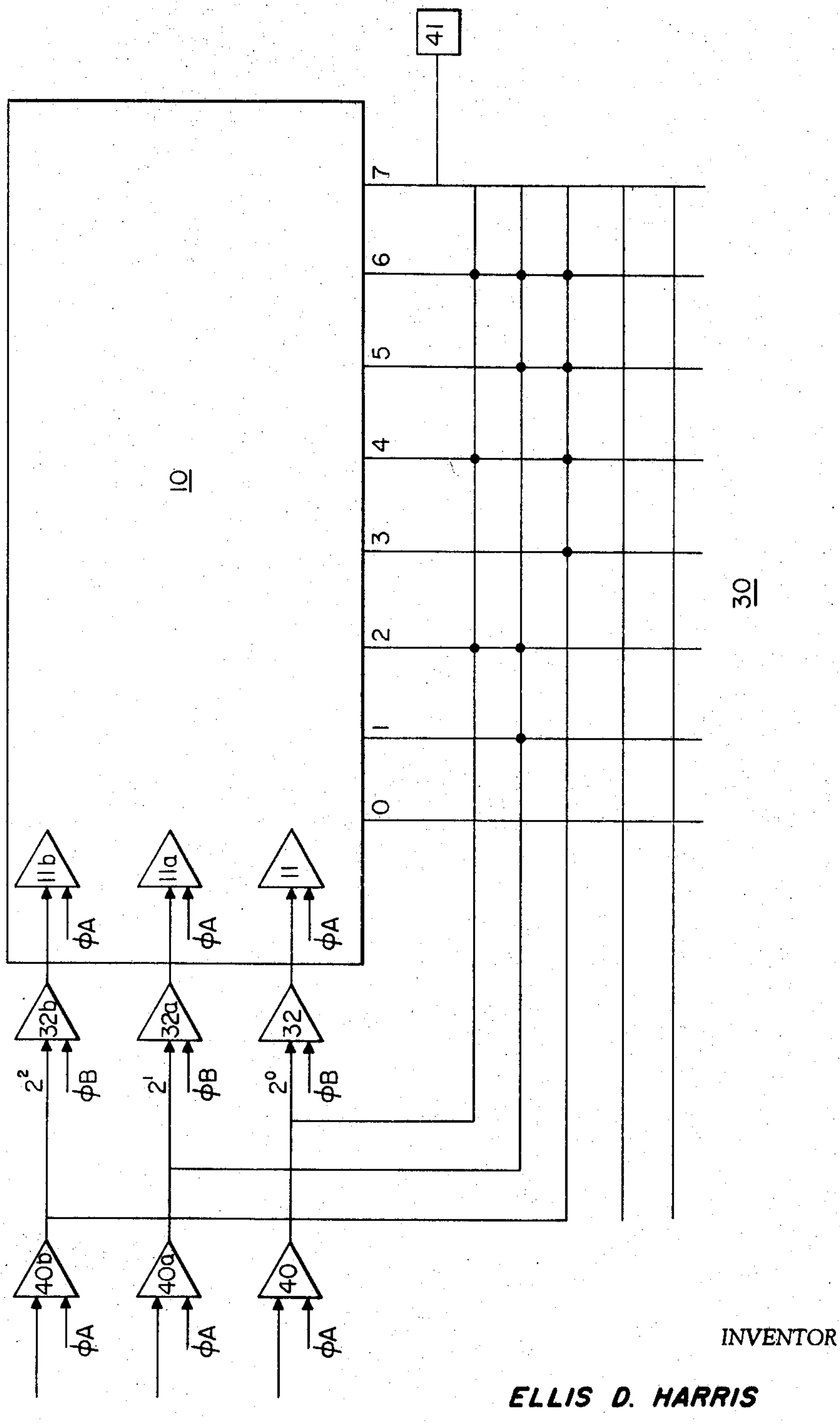
FIG. 4 illustrates the invention connected to function as a delay generator.

In FIG. 4 the invention is connected to function as a delay device. The apparatus of FIG. 4 is somewhat similar to that illustrated in FIG. 3. In FIG. 4 the incoming signal, in the form of a binary signal, is applied to gates 32, 32*a* and 32*b* by gates 40, 40*a* and 40*b*. The delayed output signal appears in decimal output 7 of matrix 10 and in output circuit 41. If a binary input signal, 2 for example, is inserted in gate 40*a*, this signal will progress in one cycle of clock 20 to gate 11*a* and thereafter, by the re-entry process previously described, until an output signal will appear in decimal output 7 of matrix 10. It can be seen that the binary two input signal is delayed six cycles of the clock signal, or if the clock frequency is 1 kc, the input binary two signal results in an output signal after a delay of six milliseconds.

It is to be noted that the decimal zero output of matrix 10 is not connected to the matrix 30 in order that counting will not be initiated until a signal is inserted by the gates 40, 40*a* and 40*b*.

Figure 5:
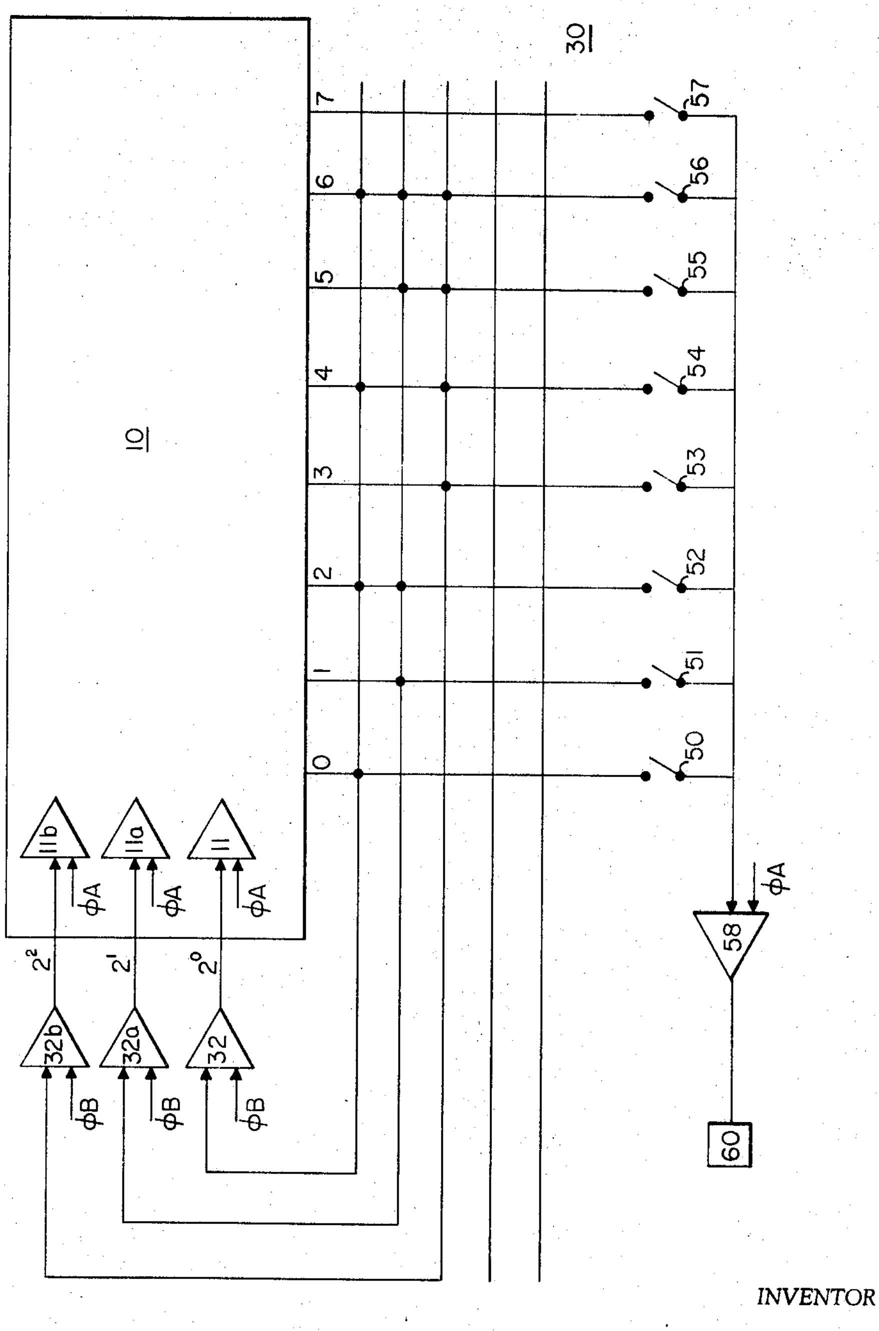
FIG. 5 illustrates the invention connected to function as a word generator.

In FIG. 5 the invention is connected to function as a word generator or series pulse coder. The apparatus of FIG. 5 is similar to that illustrated in FIG. 3 and further includes the switches 50–57 which are connected to the decimal outputs of matrix 10. These switches are in turn connected to the gate 58 which is also connected to the phase A clock signal. The gate 58 is similar to the gates 11, 32 and 40.

By selectively closing the switches 50–57, the device 60, which could typically be an FM transmitter, is energized through the switches 50–57 and gate 58 by time coded pulses. Concurrently, the matrices 10 and 30 and the gates 11, 11*a*, 11*b* and 32, 32*a* and 32*b* function in the same manner as previously described in connection with FIG. 3.

It is apparent that the invention disclosed provides a matrix circuit suitable for use in a computer, which is small and light and has a minimum power demand and is adapted to be used as a radix changer, as a permuting or coding device, as a counter, as a delay generator and as a word generator.

While it will be apparent that the present invention would most conventionally appear in electrical form, it is also clear that the invention could be operated with other forms of energy, such as pneumatic or optical. Obviously many other modifications and variations of the present invention are possible in the light of the above teachings. It is therefore to be understood, that within the scope of the appended claims, the invention may be practiced otherwise than as specifically described.

What is claimed is:

1. A matrix circuit comprising:

synchronizing means producing first and second synchronizing signals which are 180° phase separated;

a plurality of input circuits to receive input signals;

AND circuit means connected in each input circuit to receive said input signal and the first synchronizing signal and to produce a signal when the input and first synchronizing signals are simultaneously applied;

NOT circuit means, connected in each input circuit to receive the signal from said AND circuit means, for providing a signal in the absence of a signal from said AND circuit means and for providing no signal on receiving a signal from said AND circuit means;

a plurality of output circuits to produce an ouput signal;

complementor circuit means having input leads connected in each output circuit, each complementor means for providing said output signal in the absence of a signal on the complementor means input leads and for providing no signal in the presence of a signal on any of the complementor input leads and circuit means connecting said input and output circuits so that input signals are changed to an output signal according to a predetermined relationship.

2. The circuit as set forth in claim wherein the predetermined relationship is such that input signals in a binary radix are converted to an output signal in a decimal radix.

3. A coding circuit comprising:

a first matrix circuit as set forth in claim 2;

a second matrix circuit having input and output leads, the input leads of said second matrix being connected to the output circuits of said first matrix and switch means connecting said input and output leads of said second matrix, said switch means being selectively arranged in any predetermined pattern whereby the binary input signals to said first matrix appears in a desired coded relationship as binary output signals from said second matrix.

4. A counting circuit comprising:

the coding circuit set forth in claim 3 wherein the switch means are so arranged that the decimal output signals of said first matrix appear, with an increase of one, as the binary output signal of said second matrix;

second AND circuit means connected in each input circuit of said first matrix to receive the corresponding binary output signal from said second matrix and the second synchronizing signal and to provide the input signal to said first recited AND circuit means when the corresponding binary signal from the second matrix and the second synchronizing signal are simultaneously received, and utilization means connected to the output of said first matrix.

5. The counting circuit as set forth in claim 4 wherein the utilization means is a counter which provides an indication of the number of cycles which occur in the first synchronizing signal.

6. A delay circuit comprising:

the coding circuit set forth in cleam 3 wherein the switch means are so arranged that all but the lowest of the decimal output signals of said first matrix appear, with an increase of one, as the binary output signal of said second matrix;

second AND circuit means connected in each input circuit of said first matrix to receive the corresponding binary output signal from said second matrix and the second synchonizing signal and to provide the input signal to said first recited AND circuit means when the corresponding binary signal from the second matrix, or any other input signal, and the second synchronizing signal are simultaneously received;

signal input means connected to the input of said second AND circuit means, and utilization means connected to the highest value decimal output lead of said first matrix.

7. A word generator comprising the counting circuit of claim 4 wherein the utilization means include a plurality of switches one end of each switch being connected to a common output lead and the other end of each switch being connected to an output circuit of said first matrix.

References Cited

Griffin, J. F., Jr., "Decoder Driver for Indicator Tube," IBM Technical Disclosure, vol. 3, No. 2, July 1960.

"Bilateral Translator," J. W. Haskell, IBM Technical Disclosure, vol. 4, No. 4, September 1961.

MAYNARD R. WILBUR, Primary Examiner

G. R. EDWARDS, Assistant Examiner

U.S. Cl. X.R.

340—347